United States Patent [19]

Saito et al.

[11] 4,271,035
[45] Jun. 2, 1981

[54] LIQUID SCINTILLATOR SOLUTION

[75] Inventors: Tomoo Saito, Sagamihara; Yumiko Nishiyama, Hatano; Kazuo Watanabe, Yokohama; Naoko Taki, Kawasaki; Naotake Morikawa, Tokyo, all of Japan

[73] Assignee: Sagami Chemical Research Center, Tokyo, Japan

[21] Appl. No.: 94,994

[22] Filed: Nov. 16, 1979

[30] Foreign Application Priority Data

Nov. 16, 1978 [JP] Japan ................................ 53/140501

[51] Int. Cl.³ ............................................. C09K 11/06
[52] U.S. Cl. ................................................ 252/301.17
[58] Field of Search ...................... 252/301.17, 301.16, 252/301.18

[56] References Cited

U.S. PATENT DOCUMENTS

| | | | |
|---|---|---|---|
| 3,573,220 | 3/1971 | Benson | 252/301.17 X |
| 3,673,100 | 6/1972 | Benson | 252/301.17 X |
| 4,124,527 | 11/1978 | Kauffman | 252/408 |

OTHER PUBLICATIONS

Sample Preparation in Liquid Scintillation Counting, The Radiochemical Centre, Amersham, Eng., pp. 1–112, Sep. 1977.

Primary Examiner—F. C. Edmundson
Attorney, Agent, or Firm—Sughrue, Rothwell, Mion, Zinn and Macpeak

[57] ABSTRACT

A liquid scintillator solution which consists essentially of a polyalkylene glycol derivative of the formula:

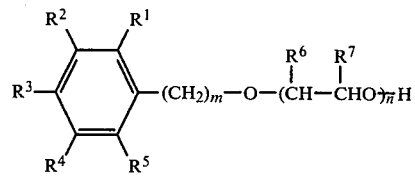

wherein $R^1$ to $R^5$ are each a hydrogen atom, a straight chain or branched chain alkyl group having 1 to 10 carbon atoms or a cyclohexyl group, $R^6$ and $R^7$ are each a hydrogen atom or a methyl group provided that both $R^6$ and $R^7$ are not methyl groups, m is 0 or 1 and n is a value between 2 and 15; and a scintillator.

5 Claims, No Drawings

LIQUID SCINTILLATOR SOLUTION

BACKGROUND OF THE INVENTION (1) Field of the Invention

The present invention relates to a liquid scintillator solution which consists essentially of a polyalkylene glycol derivative of the formula:

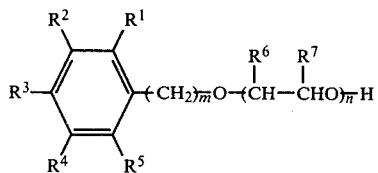

wherein $R^1$ to $R^5$ are each a hydrogen atom, a straight chain or branched chain alkyl group of 1 to 10 carbon atoms or a cyclohexyl group, $R^6$ and $R^7$ are each a hydrogen atom or a methyl group provided that both $R^6$ and $R^7$ are not methyl groups, m is 0 or 1 and n is a value between 2 and 15; and a scintillator.

(2) Description of the Prior Art

Liquid scintillator solutions (or cocktails) are used in liquid scintillation counting. Liquid scintillation counting is extensively employed for measuring radioactivity including low energy $\beta$-radiation, for example, for measuring radioisotopes such as $^{14}C$, $^{35}S$, $^3H$, etc. In general, in liquid scintillation counting, a sample for counting is first prepared by adding a radioactive sample to a liquid scintillator solution and dissolving, dispersing or emulsifying it.

The components of a liquid scintillator solution are a solvent and one or two scintillators. Conventionally, the solvent is usually an aromatic liquid such as an alkylbenzene like toluene. The function of this solvent is to absorb energy generated by the radioactive decay as excitation energy and then transfer it to the scintillator. The scintillator will, in turn, convert the transferred energy to light. Although aromatic liquids such as alkylbenzenes have good energy transfer efficiency, their main disadvantage is that they cannot be used with a water soluble sample.

Most samples of biological and environmental interest are aqueous solutions and contain salts, proteins, carbohydrates etc. Most of these samples are insoluble in aromatic hydrocarbons and, accordingly an accurate and reproducible measurement cannot be expected with these solvent systems. This is because the average range of a $\beta$-ray from $^3H$ in water is 1.2 microns and that from $^{14}C$ is 12 microns and hence the scintillation does not take place unless the scintillator particles are present within such short range.

In order to overcome such problem, two methods have been developed (see Liquid Scintillation Measurements, by Hiroaki Ishikawa, published by Nan-zan Do, 1977, p. 22). One of these methods employs a co-solvent which is soluble in both water and aromatic solvents, for example, alcohols, dioxane etc. By this method, an accurate and reproducible measurement can be attained if the amount of sample is small enough to give a uniform solution. However, with an increase in the amount of the sample, it becomes more difficult to obtain a homogeneous solution. Therefore, in this method, the amount of the sample is restricted and the components measured, such as salts, proteins, carbohydrates, can only be used within a limited concentration range. Furthermore, dioxane is volatile and its vapor is toxic.

The second method is to prepare a liquid scintillator solution by adding a surfactant or an emulsifier to an aromatic hydrocarbon. Thus, this method provides a virtually uniform system in which numerous appropriately fine micelles are present as a colloidal suspension, dispersion or emulsion. Although this method can measure radioactivity efficiently over a range where such uniform gel is present, there are disadvantages. There is a restriction on the amount of a sample which can be dissolved in the liquid scintillator solution and it is difficult to predict the influence of temperature on the solubility and dispersibility of the sample. Another disadvantage is difficulty in predicting the influence of the time factor on the stability on the sample. Still another disadvantage is that when the amount of a water soluble sample added is increased, the viscosity of a liquid scintillator solution of this type suddenly increases beyond the point of gel formation (see Comparative Examples below). In an ordinary batchwise measurement, such as increase in viscosity prevents the formation of a gel having a uniform composition. A nonuniform dispersion results in a variation in activity from one portion of the test vial to the next. In a flow type liquid scintillation counting, e.g., liquid radiochromatography, such liquid scintillator solutions are only useful to an extremely limited extent due to their inability to pass uniformly through the flow tube.

In addition, all liquid scintillator solutions which have hitherto been employed contain, as the chief components, volatile flammable solvents, which is a great drawback. Still further, these liquid scintillator solutions cannot be disposed of merely by diluting with a large amount of water and discarding, because copious insolubles would be produced, a chief reason for the difficulty in disposal of the used liquid scintillator solutions.

SUMMARY OF THE INVENTION

In order to overcome the afore-mentioned disadvantages of the conventional techniques, studies have been detected to an improved liquid scintillation technique and more particularly to an improved liquid scintillator solution.

Accordingly, the liquid scintillator solution in accordance with the present invention consists essentially of a polyalkylene glycol derivative of the formula (I) and one or two scintillators and does not contain material amounts of other solvents or co-solvents:

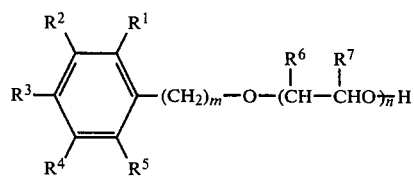

wherein $R^1$ to $R^5$ are each a hydrogen atom, a straight chain or branched chain alkyl group of 1 to 10 carbon atoms or a cyclohexyl group, $R^6$ and $R^7$ are each a hydrogen atom or a methyl group provided that both $R^6$ and $R^7$ are not methyl groups, m is 0 or 1 and n is a value between 2 and 15; and a scintillator.

DETAILED DESCRIPTION OF THE INVENTION

Formerly, some of the polyalkylene glycol derivatives of the formula (I) above have been added to an emulsified scintillator composition in order to impart hydrophilic properties to the liquid scintillator solutions. In these prior art liquid scintillator solutions, it has been reported that all the alkyl groups in the polyalkylene glycol derivative must have at least four carbon atoms so that the system containing the water soluble sample can be dissolved, emulsified or dispersed since an aromatic hydrocarbon is employed as the solvent, as disclosed in U.S. Pat. Application Ser. Nos. 607,218 (corresponding to British Pat. No. 1,179,967) and 607,219 filed on Jan. 4, 1967 and 720,451 (now U.S. Pat. No. 3,573,218) filed on Apr. 11, 1978. At the same time, the ratio of the degree of polymerization of the alkylene groups to the number of carbon atoms in the alkyl group must be 0.86–1.67 as reported. Therefore, an oxyalkylene group having an alkyl chain of a proper length and a proper degree of polymerization is required.

The liquid scintillator solutions in accordance with the present invention use a polyalkylene glycol derivative of the formula (I) above as solvent for the scintillator(s). In the present invention, the polyalkylene glycol derivative of the formula (I) above plays the part which has been played by the aromatic hydrocarbons in the prior art methods.

In accordance with the present invention, it is desirable for the polyalkylene glycol derivative to contain as many aromatic groups as possible per unit volume while retaining a sufficient water solubility. Accordingly it is preferred, for better emission efficiency, that the sidechain alkyl groups which do not effectively participate in energy transfer are adequately short. In other words, in the formula (I) above, $R^1$ and $R^5$ are each a hydrogen atom, a straight chain or branched chain alkyl group of 1 to 10 carbon atoms or a cyclohexyl group, with a hydrogen atom and a lower ($C^1$ to $C^4$) alkyl group being preferred. It is also preferred that the oxyalkylene groups which do not effectively participate in energy transfer are adequately short while the water solubility is satisfactorily retained. Accordingly, the oxyalkylene group suitably has a degree of polymerization ranging from 2 to 15. Preferably, the degree of polymerization is in a range of 2 to 5, because it contains more aromatic rings per unit volume as mentioned above.

By use of the liquid scintillator solutions in accordance with the present invention, a sample to be analyzed which contains a relatively high proportion of water can now be more accurately measured than before, and its handling is easy because it is not volatile and flammable.

In addition, when an aqueous solution is used as a sample, its addition does not bring about an increase in viscosity and thus this system is especially suitable as the liquid scintillator solution for liquid radiochromatography utilizing water. Moreover, the liquid scintillator solutions, in fact, enable the disposal by dilution with water after use and are not influenced by the mode and order of addition of samples, the time factor and the like.

In the present invention, the sample can be sufficiently dissolved or dispersed simply by shaking in the liquid scintillator solution at room temperature.

Examples of the polyalkylene glycol derivative of the formula (I) above which is one component of the solution of the present invention are polyoxyethylene phenol ether, o-m- or p-polyoxyethylene methylphenol ether, polyoxyethylene 2,3-, 2,4-, 2,5-, 2,6-, 3,4-, or 3,5-dimethylphenol ether, polyoxyethylene trimethylphenol ether, polyoxyethylene o-, m- or p-isopropylphenol ether, polyoxyethylene ethylphenol ether, polyoxyethylene n-propylphenol ether, polyoxyethylene n, iso-, sec- or tert-butylphenol ether, polyoxyethylene n-, iso- or neo-pentylphenol ether, polyoxyethylene hexyl-, heptyl-, octyl-, nonyl- or decyl-phenol ether, polyoxyethylene cyclohexylphenol ether, polyoxypropylene phenol ether, polyoxypropylene o-, m- or p-phenol ether, polyoxypropylene 2,3-, 2,4-, 2,5-, 2,6-, 3,4- or 3,5-dimethylphenol ether, polyoxypropylene trimethylphenol ether, polyoxypropylene o-, m- or p-isopropyl phenol ether, polyoxypropylene ethylphenol ether, polyoxypropylene n-propylphenol ether, polyoxypropylene n-, iso-, sec- or tert-butylphenol ether, polyoxypropylene n-, iso- or neo-pentylphenol ether, polyoxypropylene hexyl-, heptyl-, octyl-, nonyl- or decylphenol ether, polyoxypropylene cyclohexylphenol ether, polyoxyethylene benzyl ether, polyoxyethylene o-, m- or p-methylbenzylalcohol ether, polyoxyethylene 2,3-, 2,4-, 2,5-, 2,6-, 3,4- or 3,5-dimethylbenzylalcohol ether, polyoxyethylene 2,4,6-trimethylbenzylalcohol ether, polyoxyethylene o-, m- or p-isopropylbenzylalcohol ether, polyoxyethylene ethylbenzylalcohol ether, polyoxyethylene n-propylbenzylalcohol ether, polyoxyethylene n-, iso-, sec- or tert-butylbenzylalcohol ether, polyoxyethylene n-, iso- or neo-pentylphenol ether, polyoxyethylene hexyl-, heptyl-, octyl-, nonyl- or decyl-benzyl ether, polyoxyethylene cyclohexylbenzylalcohol ether, polyoxypropylene benzylalcohol ether, polyoxypropylene o-, m- or p-methylbenzylalcohol ether, polyoxypropylene 2,3-, 2,4-, 2,5-, 2,6-, 3,4- or 3,5-dimethylbenzylalcohol ether, polyoxypropylene-2,4,6-trimethylbenzylalcohol ether, polyoxypropylene o-, m- or p-isopropylbenzylalcohol ether, polyoxypropylene ethylbenzylalcohol ether, polyoxypropylene n-propylbenzylalcohol ether, polyoxypropylene n-, iso-, sec- or tert-butylbenzylalcohol ether, polyoxypropylene n-, iso- or neo-pentylphenol ether, polyoxypropylene hexyl-, heptyl-, octyl-, nonyl- or decyl-benzylalcohol ether, polyoxypropylene cyclohexylbenzylalcohol ether etc. In these examples, the polyoxyethylene and polyoxypropylene moieties have a degree of polymerization (n) of 2 to 15.

Conventional scintillators may be used in the present invention and include a first solute and a second solute, which can be employed separately or in combination. Examples of the first solute are p-terphenyl, 2,5-diphenyloxazole, 2-phenyl-5-(4-biphenyl)-1,3,4-oxadiazole, 4-(4-tert-butylphenyl)-5-(4-biphenylyl)-1,3,4-oxadiazole, 4,4'-bis-(2-butyloctyloxy)-p-quarterphenyl, 2,5-bis-2-(5'-tert-butylbenzoxazolyl)-thiophene etc. Examples of the second solute are 1,4-bis-2-(5'-phenyloxazolyl)-benzene, 2-(1'-naphthyl)-5-phenyloxazole, p-bis-(o-methylstyryl)-benzene, 2-(4'-biphenylyl)-6-phenylbenzoxazole etc.

The scintillator must be present in an amount sufficient to make the solution of the present invention effective as the liquid scintillator solution. The optimum results can vary depending on the nature of the scintillator, the composition of the cocktail and the natures of the other components. The amount(s) of the scintillator(s) can vary depending on the nature of the first and second solutes and the particular sample used, but generally the first solute is employed in an amount of about 1-50 g per liter of the polyalkylene glycol derivative of the formula (I) above. From the standpoint of the relation between emission efficiency and the external standard radiation source ratio, it is preferable to use the first solute in about 3 to 10% per liter of the polyalkylene glycol derivative. The first solute can be used either alone or in combination with the second solute. The second solute can be employed in an amount of about 0.05 to 1 g per liter of the polyalkylene glycol derivative of the formula (I) above. From the standpoint of the solubility and economy, the second solute is preferably used in about 0.1-0.5 g/l.

The present invention will be more particularly described in the following examples and comparative examples.

EXAMPLE 1

Synthesis of polyalkylene glycol derivatives 0.22 g of potassium hydroxide was added to 22.18 g of p-cresol to which were introduced 46.6 g of gaseous ethylene oxide at 125° C. to obtain the desired product,

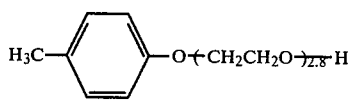

(hereinafter referred to as A) having a boiling point of 129°–145° C./2 mmHg. The reaction was quenched by neutralizing with 0.5 ml of an acid, such as acetic acid. Thereafter, 30 ml of a 15% aqueous hydrogen peroxide solution was added for decoloring.

In a similar manner, the following polyalkylene glycol derivatives were synthesized.

TABLE 1

| | Polyalkylene glycol derivative | Physical properties | | Polyalkylene glycol derivative | Physical properties |
|---|---|---|---|---|---|
| B | ⌬—O(CH$_2$CH$_2$O)$_2$H | b.p.: 110–140° C./1–2 mmHg | I | H$_{19}$C$_9$—⌬—O(CH$_2$CH$_2$O)$_{10}$H | cloud point: 1% aq. 61.2° C. |
| C | ⌬—O(CH$_2$CH$_2$O)$_3$H | b.p.: 120–155° C./1–2 mmHg | J | H$_3$C—⌬—CH$_2$O(CH$_2$CH$_2$O)$_{3.2}$H | b.p.: 110–132° C./2 mmHg |
| D | ⌬—O(CHCHO)$_2$H* with R$^6$ R$^7$ | b.p.: 114–140° C./2–3 mmHg | K | H$_3$C—⌬(H$_3$C)—O(CH$_2$CH$_2$O)$_{2.1}$H | b.p.: 111–140° C./2 mmHg |
| E | C$_6$H$_{11}$—⌬—O(CH$_2$CH$_2$O)$_{2.8}$H | b.p.: 180–200° C./3–4 mmHg | L | (H$_3$C)$_2$—⌬—O(CH$_2$CH$_2$O)$_{3.8}$H | b.p.: 125–144° C./2 mmHg |
| F | ⌬—CH$_2$O(CH$_2$CH$_2$O)$_3$H | b.p.: 126–144° C./3 mmHg | M | H$_3$C—⌬(CH$_3$)—O(CH$_2$CH$_2$O)$_{2.6}$H | b.p.: 120–125° C./2 mmHg |
| G | H$_3$C—⌬—O(CHCHO)$_7$H* with R$^6$ R$^7$ | cloud point: 0.5% aq. 5.5° C. | N | H$_3$C—⌬—O(CH$_2$CH$_2$O)$_{4.36}$H | b.p.: 130–160° C./2 mmHg |
| H | H$_3$C—⌬—O(CH$_2$CH$_2$O)$_{2.7}$H | b.p.: 130–150° C./3 mmHg | | | |

*One of R$^6$ and R$^7$ is a methyl group and the other is hydrogen atom.

EXAMPLE 2

Using liquid scintillator solutions prepared from the polyalkylene derivatives obtained in Example 1 and the scintillators given in the following table, the external standard channel ratios were measured. The results are shown in Table 2. In this connection, the external standard channel ratio is a ratio of countings of the two channels (pulse height) of the external standard.

The counting efficiency of the sample can be read from a quenching correction curve showing the relation of the external standard radiation source and the counting efficiency obtained using the standard sample. Then, by determining the external standard radiation source ratio, the relative counting efficiency of the liquid scintillator can be obtained.

The measurements were conducted under the conditions of Gain 700, iso-set $^3$H full window for $^3$H and iso-set $^{14}$C window for $^{14}$C. $^{137}$Cs was used as the external standard. The scintillation counter used was a Beckman LS-250. In Table 2, PPO and DMPOPOP in the scintillator column are 2,5-diphenyloxazole and 1,4-bis-2-(4-methyl-5-phenyloxazolyl) benzene, respectively.

TABLE 2

| Scintillator Cocktail | | | | External standard radiation source ratio |
|---|---|---|---|---|
| Polyalkylene glycol deriv. | (g) | PPO (g) | DMPOPOP (mg) | |
| A | 6 | 0.03 | 1.8 | 0.530 |
|   | 6 | 0.03 | 1.8 | 0.500 |
| B |   |   |   |   |
|   | 6 | 0.6 | 1.8 | 0.559 |
| C | 6 | 0.03 | 1.8 | 0.490 |
| D | 6 | 0.03 | 1.8 | 0.496 |
| E | 6 | 0.03 | 1.8 | 0.482 |
| F | 6 | 0.03 | 1.8 | 0.440 |
| G | 6 | 0.03 | 1.8 | 0.423 |

TABLE 2-continued

| Scintillator Cocktail | | | | External standard |
|---|---|---|---|---|
| Polyalkylene glycol deriv. | PPO (g) | DMPOPOP (mg) | | radiation source ratio |
| H | 6 | 0.03 | 1.8 | 0.517 |
| I | 6 | 0.03 | 1.8 | 0.431 |
| J | 6 | 0.03 | 1.8 | 0.491 |
| K | 6 | 0.03 | 1.8 | 0.529 |
| L | 6 | 0.03 | 1.8 | 0.533 |
| M | 6 | 0.03 | 1.8 | 0.524 |
| N | 6 | 0.03 | 1.8 | 0.479 |

COMPARATIVE EXAMPLE 1

Comparison with commercial product in viscosity

Using AQUASOL-2 (brandname, commercially available from New England Nuclear Co.) having varying water contents and a liquid scintillator solution prepared from 30 g of the above compound N and, as the scintillator, 0.15 g of PPO and 9 mg of DMPOPOP (the solution being hereinafter referred to as Solution (n)), the velocity of a ball falling for certain distance in a glass cylinder of 12 mm inner diameter and 30 cm in length was measured. The experiment was conducted in a constant temperature tank maintained at 19° C. The ball used had a diameter of 3 mm and weighed 0.1102 g. The results are shown in Table 3.

TABLE 3

| Water Content (%) | Falling Velocity (sec/10 cm) | |
|---|---|---|
| | AQUASOL-2 | Solution (n) |
| 0 | 0.2 | 0.9 |
| 6.25 | 0.2 | 0.8 |
| 14 | 0.9 | 0.7 |
| 21 | 1809 | 0.5 |
| 33 | 21429 | 0.3 |
| 40 | — | 0.3 |
| 50 | — | 0.2 |
| 57 | — | 0.2 |
| 68 | — | 0.1 |

COMPARATIVE EXAMPLE 2

Comparison of apparent counting efficiencies between the commercial product and the flow system The dynamic counting efficiencies were determined at varying water contents in the liquid scintillator solutions.

The relations of the counting efficiency and the water content in the case of the flow system are shown in Table 4 for $^{14}C$ and in Table 5 for $^{3}H$. The sources for $^{14}C$ and $^{3}H$ were $^{14}C$-toluene and $^{3}H_2O$, respectively. Water was used as the quencher. The concentrations of radioactivity used were $2\times10^4$–$5\times10^5$ dpm for $^{3}H$ and $2\times10^4$–$8\times10^4$ dpm for $^{14}C$. In the tables, the values of dynamic counting efficiencies were obtained by fixing the volume of the detector at 1 ml and the flow rate of the liquid chromatography effluent at 5 ml/min calculated as water. The liquid scintillator solution used was Solution (n) used in Comparative Example 1.

TABLE 4

| Water Content (%) | Dynamic Counting Efficiencies $^{14}C$ | |
|---|---|---|
| | AQUASOL-2 ($\times 10^{-1}$) | Solution (n) ($\times 10^{-1}$) |
| 1.6 | 3.5 | 2.5 |
| 4.8 | 9.2 | 8 |
| 10.4 | 20 | 15 |
| 11.7 | 22 | 17 |

TABLE 4-continued

| Water Content (%) | Dynamic Counting Efficiencies $^{14}C$ | |
|---|---|---|
| | AQUASOL-2 ($\times 10^{-1}$) | Solution (n) ($\times 10^{-1}$) |
| 20 | — | 27 |
| 32.6 | — | 44 |
| 40 | — | 45 |
| 50 | — | 53 |
| 60 | — | 49 |

TABLE 5

| Water Content (%) | Dynamic Counting Efficiencies $^{3}H$ | |
|---|---|---|
| | AQUASOL-2 ($\times 10^{-1}$) | Solution (n) ($\times 10^{-1}$) |
| 1.6 | 1.0 | 0.45 |
| 4.8 | 3.2 | 1.1 |
| 10.4 | 6.8 | 2.0 |
| 11.7 | 7.1 | 2.1 |
| 20 | — | 2.9 |
| 32.6 | — | 3.2 |
| 40 | — | 2.6 |
| 47.8 | — | 2.2 |

The results shown in Tables 4 and 5 indicate that in experiments using AQUASOL-2, runs with a water content more than 20% are not measurable since at such high water contents the mixtures are not flowable, because the commercial product (AQUASOL-2) suddenly increases in viscosity as it incorporates water (see Comparative Examples) and it is very difficult to use since it is not in the free flowing state. Therefore, the range in which AQUASOL-2 can be employed in the free flowing state is extremely limited. In the commercial products having a low viscosity the water content is in a range of 0 to 12%. On the other hand, with Solution (n), the viscosity of the scintillator does not change remarkably and it tends to decrease with the water content.

The maximum values of the dynamic counting efficiencies for $^{3}H$ and $^{14}C$ in the free flowing state for testing the viscosities were calculated. The calculation procedures are as follows.

In the case of $^{14}C$, with Solution (n), the maximum point of the figure of merit was obtained at a water content of 50% and the efficiency at this point was 53%. The flow rate of the liquid chromatography effluent was 5 ml/min. and that of the scintillator solution was the same, thereby providing a total flow rate of 10 ml/min. The time required to pass through the detector having a volume of 1 ml was 1/10 min. Accordingly, the dynamic counting efficiency was $0.53\times1/10=0.053$. On the other hand, with AQUASOL-2 the maximum value was 95% in efficiency at a water content of 12%, taking the viscosity into consideration. By calculating similarly, the flow rate of AQUASOL-2 was 38 ml/min. while the flow rate of the liquid chromatography effluent was 5 ml/min. and thus the time required to pass through the detector was 0.023 min. Therefore, the dynamic counting efficiency then was $0.95\times0.023=0.022$.

The similar calculation procedures for $^{3}H$ gave the dynamic counting efficiency of Solution (n) of 0.0032 and that of AQUASOL-2 of 0.0071.

In this connection, the figure of merit is the value obtained from the water content (%) multiplied with the counting efficiency (%) at this content, and the greater values are regarded more excellent as water soluble scintillators.

While the invention has been described in detail and with reference to specific embodiments thereof, it will be apparent to one skilled in the art that various changes and modifications can be made therein without departing from the spirit and scope thereof.

We claim:

1. A liquid scintillator solution which consists of a polyalkylene glycol derivative of the formula:

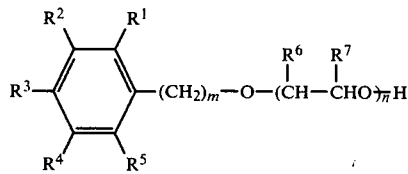

wherein $R^1$ to $R^5$ are each a hydrogen atom, a straight chain or branched chain alkyl group having 1 to 10 carbon atoms or a cyclohexyl group, $R^6$ and $R^7$ are each a hydrogen atom or a methyl group provided that both $R^6$ and $R^7$ are not methyl groups, m is 0 or 1 and n is a value between 2 and 15; and a scintillator.

2. The liquid scintillator solution of claim 1 in which as the scintillator a first solute is present in an amount of about 3 to 10 g per liter of said polyalkylene glycol derivative.

3. The liquid scintillator solution of claim 1 in which as the scintillator a first solute is present in an amount of about 3 to 10 g per liter of said polyalkylene glycol derivative and a second solute is present in an amount of 0.1 to 0.5 g per liter of said polyalkylene glycol derivative.

4. The liquid scintillator solution of claim 1 in which $R^1$ to $R^5$ of the polyalkylene glycol derivative are each a hydrogen atom or an alkyl group having 1 to 4 carbon atoms.

5. The liquid scintillator solution of claim 1 in which n of the polyalkylene glycol derivative is a value between 2 and 5.

* * * * *